United States Patent Office 2,926,212
Patented Feb. 23, 1960

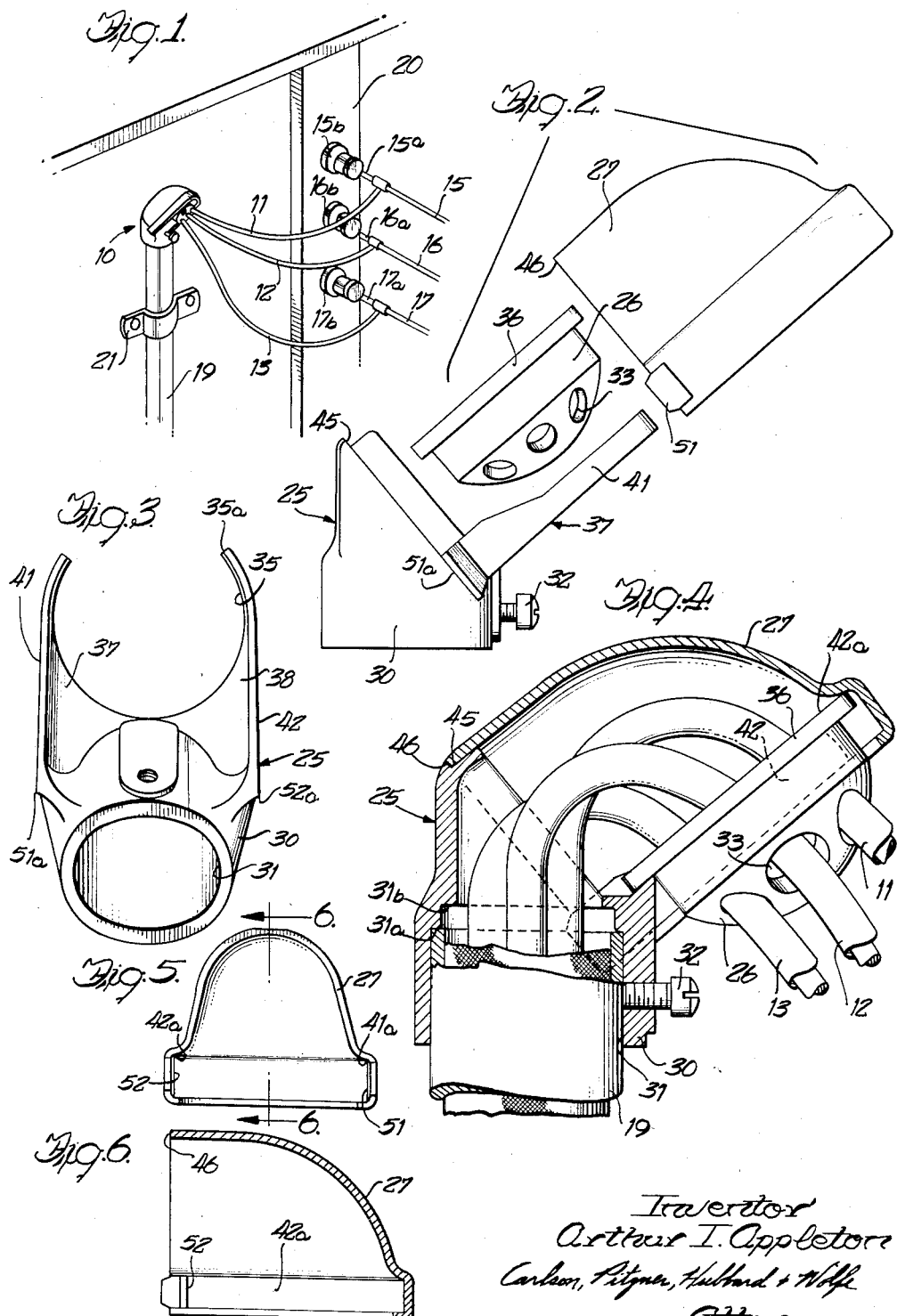

2,926,212

SERVICE ENTRANCE FITTING WITH SLIDING HOOD

Arthur I. Appleton, Northbrook, Ill.

Application March 25, 1957, Serial No. 648,356

3 Claims. (Cl. 174—81)

The present invention relates in general to service entrance fittings for leading electrical conductors from overhead power lines into buildings. More particularly, the invention has to do with hooded service entrance fittings which prevent the entry of moisture and other foreign material into electric conduits leading conductors downwardly from overhead power lines to the meter and distribution systems of various buildings.

It is an object of the invention to provide a service entrance fitting affording completely reliable performance of the functions noted above which is economical to manufacture and is adapted for simple and convenient installation.

In more detail, it is an object to provide a fitting of the above type in which the protective bonnet or hood requires no auxiliary fasteners or the use of tools in order to be securely locked into place, but which can be installed with a single quick movement of the hood. It is a collateral object to provide such a fitting having its protective hood locked into place by a snap-like detent action but whose parts are so constructed that movement or pulling of the connector lines passing into the fitting cannot tend to release the hood.

It is a more specific object to provide a fitting of the type characterized above that may be inexpensively die cast and which requires no subsequent machining operations as would be needed if additional separate fasteners were used in assembling the fitting.

Other objects and advantages of the invention will become apparent upon reading the attached detailed description and upon reference to the drawings in which:

Figure 1 is a perspective view of a part of a building illustrating a service entrance fitting, embodying the features of the invention, installed to lead conductors from overhead power lines into a downwardly extending conduit.

Fig. 2 is an exploded elevation view showing the component parts of the service entrance fitting shown in Fig. 1.

Fig. 3 is a bottom view of the head portion of the fitting shown in Fig. 1.

Fig. 4 is a vertical sectional view of the assembled fitting shown in Fig. 1.

Fig. 5 is a rear elevation view of the hood portion of the fitting shown in Fig. 1.

Fig. 6 is a longitudinal cross sectional view taken along lines 6—6 of Fig. 5.

While the invention will be described in connection with a preferred embodiment, it will be understood I do not intend to limit the invention to that embodiment. On the contrary, I intend to cover all alterations, modifications and equivalents as may be included within the spirit and scope of the invention as defined by the appended claims.

Turning first to Fig. 1, there is shown a hooded entrance fitting 10 utilized in a typical wiring installation wherein the fitting 10 is employed to support and protect electrical conductors 11—13, which extend in slack loops from respective ones of overhead service lines 15—17 and are guided downwardly into a metal conduit 19. The latter leads the conductors to the meter and power distribution system (not shown) of a building 20.

As is conventional, the overhead service lines 15—17 lead up to the building 20 from a yard pole (not shown) carrying main power lines, and are anchored by cables 15a—17a to respective anchoring insulators 15b—17b, which are secured to the upper corner of the building 20. Attaching the conduit 19 in vertical position on the outer wall of the building 20 are a plurality of suitable straps 21, the upper end of the conduit being spaced from the insulators 15b—17b to permit the connectors 11—13 to be drooped between them. The sagging or drooping configuration of the conductors 11—13 permits rain and other moisture to drip from the central portions of the loops, and thus prevents such moisture from running downwardly along the conductors and into the conduit 19.

The entrance fitting 10 embodying the invention includes a head 25, adapted to be secured to the end of the conduit 19, which supports a conductor-directing separator 26 and is covered by a bonnet or hood 27 that slides and snap-locks onto the head 25 for both shielding the end of the conduit 19 and locking the separator 26 in place. In the preferred embodiment, the head 25 comprises an annular body 30 adapted to be securely seated and locked onto conduits of various sizes simply upon the tightening of a single retaining fastener. For this purpose, the body 30 is formed with a vertical annular passage 31 having a plurality of stepped radial shoulders at its upper end. In the illustrated embodiment, the passage 31 is provided with a pair of radial shoulders 31a and 31b which decrease in radius toward the upper end of the body 30. Thus, it will be seen that the lower shoulder 31a has a larger radius and is adapted to receive in abutting relation the upper end of a relatively large diameter, heavy wall conduit (see Fig. 4), while the upper shoulder 31b is of relatively smaller radius and adapted to receive in abutting relation the upper end of a smaller diameter thin-walled conduit (not shown). To lock the head 25 onto the conduit, a single retaining fastener or screw 32 is threaded through the wall of the annular body 30 and is adapted to be tightened into biting engagement with the sidewall of the conduit 19.

The separator 26 is preferably formed of an insulating plastic material and is provided with a plurality of apertures 33 through which the conductors 11—13 may pass. For supporting the conductor 26 in its proper inclined position, the head 25 is provided with a socket 35 (see Fig. 3) shaped to receive the separator, and the separator 26 is formed with a laterally extending flange 36 which acts to retain the separator within the socket. The socket 35 is formed by two upwardly inclined arms 37, 38 formed integrally with the head 25. It will be apparent that when the separator 26 is received within the socket 35, the separator flange 36 will rest on the tops of arms 37, 38 so that the separator is firmly supported in its proper inclined position to receive and guide the conductors 11—13.

In order to permit the hood 27 to be slid over and locked into position on the head 25, the outer faces of the arms 37, 38 are contoured to define generally parallel slides 41, 42, respectively, and the hood 27 is formed with cooperating grooves 41a and 42a adapted to slidingly fit over the slides 41, 42. In the illustrated embodiment, the grooves 41a, 42a are sufficiently wide to fit over one of the slides 41, 42, respectively, as well as the edge of the separator flange 36 when the latter rests on the top of the arms 37, 38 (see Fig. 4). In this way the grooves 41a, 42a perform a locking function by clamping the separator flange 36 down onto the arms 37, 38 to lock the separator in proper position within the socket 35.

The hood 27 is shaped so that when slid fully onto the slides 41, 42, it completely closes the top of the head 25. To avoid any possibility of moisture leakage between the hood 27 and the head 25, the latter is provided with an arched shoulder 45 adapted to receive the edge 46 of the hood 27. Thus, when the hood 27 has been positioned on the head 25, the hood edge 46 is received by the shoulder 45 to present a smooth, pleasing, outer configuration for the service entrance fitting 10 and also provide an overlapping connection between the hood and head that will obviate any possibility of fluid leakage between the two.

In order to securely snap-lock the hood 27 onto the head 25 without the usual auxiliary fasteners, cooperative recess and detent means are provided. In the preferred embodiment, detents 51, 52 are formed integrally with the hood 27 at the outer ends of the grooves 41a, 42a, respectively, and the head 25 is provided with cooperating recesses 51a and 52a. Thus, to lock the hood 27 onto the head 25, it is merely necessary to slide the hood sufficiently far along the slides 41, 42 to cause the detents 51, 52 to snap behind the recesses 51a, 52a.

It will be noted that the detents 51, 52 are formed on the hood 27 at the points most widely separated by the material from which the hood is formed. In this way the slight inherent resilience of the material is fully utilized for providing the snap action which allows the detents 51, 52 to spring outwardly and snap behind the cooperating locking recesses 51a, 52a.

It will also be appreciated that the fitting 10 is constructed so that no amount of strain or tension on the conductors 11—13 will tend to loosen the snap-locking action securing the hood 27 onto the head 25. This is accomplished by arranging the conductors 11—13 to be guided and received by the separator 26 when the fitting is assembled and installed, and by restraining the separator against all lateral movement within the rigid socket 35. Thus, the separator cannot be moved upwardly in the direction which would tend to engage the hood 27 and unseat the detents 51, 52 from their respective recesses 51a, 52a, and therefore this snap-locking connection, although in itself firm and strong, is not subject to loosening or unseating strain.

To manufacture the entrance fitting 10, it is proposed that both the head 25 and the hood 27 may be simply and economically die cast. This expedient is practical since the head 25 and hood 27 require no auxiliary fasteners to be mutually locked, and therefore machining operations to produce threaded holes and the like are avoided. This factor, along with the straightforward functional design of the fitting 10, permits rapid and economical manufacture.

It will be apparent that installation of the fitting 10 is particularly rapid and convenient. Only the single screw 32 need be tightened to firmly secure the head 25 onto the conduit 19. The separator 26 is then guided over the conductors 11—13, and the former may be directly positioned within the socket 35.

To avoid the necessity of threading the conductors 11—13 through a closed loop, the socket 35 is provided with an open end 35a (see Fig. 3) which permits the conductors 11—13, when being installed, to be simply moved laterally within the socket area so that the separator area 26 can be properly seated.

As a final step, the hood 27 is fitted over the slides 41, 42 and is locked into position with a single, short, quick movement to complete the fitting assembly. No further fastening or securing operations are necessary. It can be seen that the assembled fitting 10 provides complete protection for the conductors 11—13 and the open end of the conduit 19.

I claim as my invention:

1. A service entrance fitting comprising, in combination, a head having an annular body adapted to surround and cover the end of an electrical conduit, said head having arms inclined upwardly from the top of said annular body which define a pair of outwardly facing, parallel slides, said arms cooperating to define a socket for supporting and positioning a cable separator in the plane of the arms, a resilient hood contoured to enclose said arms and fit in snug, overlapping relation on said head so as to cover the annular body, said hood having opposed parallel grooves formed to surround said slides so that the hood may be slid along the arms to close and cover the annular body, and cooperating recess and detent means formed on the hood and body for snap-locking the resilient hood in place when it is slid over the head.

2. A service entrance fitting comprising, in combination, a hollow head with an annular lower opening adapted to receive an electrical conduit and an upper opening annularly disposed relative to said lower opening, said head having separator retaining arms with parallel outer slides extending outwardly from the lower edge of said upper opening, a cable separator removably fitted between said arms, a hood having parallel sides formed to slidably interfit around the parallel outer sides of said arms and being contoured to slide over and thus lock said separator into place, and detent locking means formed on said hood and head for snap-locking said hood onto said arms with the hood in snug engagement with the head about said upper opening.

3. A service entrance fitting comprising, in combination, a hollow head with an annular lower opening adapted to receive an electrical conduit and an upper opening annularly disposed relative to said lower opening, said head having separator retaining arms with parallel outer sides extending outwardly from the lower edge of said upper opening, a cable separator removably fitted between said arms and having flanges overlying said arms, a resilient hood having parallel sides formed to slidably interfit around both the parallel outer sides of said arms and said overlying separator flanges so as to clamp the separator into place, and detent locking means formed on said resilient hood and head for snap-locking said hood onto said arms with the hood in snug engagement with the head about said upper opening.

References Cited in the file of this patent

UNITED STATES PATENTS

| | | |
|---|---|---|
| 1,822,879 | Brachtl | Sept. 15, 1931 |
| 2,374,971 | Benander | May 1, 1945 |
| 2,404,152 | Weller | July 16, 1946 |
| 2,665,353 | Popp | Jan. 5, 1954 |
| 2,739,999 | Gill | Mar. 27, 1956 |